United States Patent [19]

Bane

[11] Patent Number: 5,493,287
[45] Date of Patent: Feb. 20, 1996

[54] METHOD OF REMOTELY READING A GROUP OF METERS

[75] Inventor: Ronald L. Bane, Stone Mountain, Ga.

[73] Assignee: Motorola, Inc., Schaumburg, Ill.

[21] Appl. No.: 206,376

[22] Filed: Mar. 7, 1994

[51] Int. Cl.$^6$ ................................................. G08L 17/00
[52] U.S. Cl. ............................. 340/825.520; 340/870.20; 340/870.30; 340/870.280
[58] Field of Search .................. 340/825.54, 825.44, 340/870.02, 870.03, 870.11, 870.13, 870.28; 364/483; 455/95, 99, 343

[56]  References Cited

U.S. PATENT DOCUMENTS

| 4,614,945 | 9/1986 | Brunius et al. | 340/870.3 |
| 4,713,808 | 12/1987 | Gaskill et al. | 340/825.44 |
| 4,799,059 | 1/1989 | Grindahl et al. | 340/870.3 |
| 5,194,860 | 3/1993 | Jones et al. | 340/870.3 |
| 5,251,214 | 10/1993 | Mertens et al. | 340/825.52 |
| 5,301,122 | 4/1994 | Halpern | 340/870.2 |

Primary Examiner—Michael Horabik
Attorney, Agent, or Firm—Andrew S. Fuller; Kenneth M. Massaroni

[57]  ABSTRACT

A remote meter reading system (10) includes a group of meter interface units in which each meter interface unit (12) is operable in an inactive state, and in which each meter interface unit (12) is periodically activated to monitor a communication channel for channel activity. The meter interface unit (12) is responsive to communication signals from a meter reading device (15). To remotely read the group of meters, the meter reading device (15) initiates communication with a target meter interface unit (12) selected from among the group of meter interface units. Next, the meter reading device (15) receives a message from the target meter interface unit (12), which contains a group identifier for the target meter interface unit (12). The meter reading device (15) then transmits a message on the communication channel which includes the group identifier received from the target meter interface unit (12).

7 Claims, 3 Drawing Sheets 5,493,287

METHOD OF REMOTELY READING A GROUP OF METERS

TECHNICAL FIELD

This invention relates in general to meter reading, and more particular, to remotely reading groups of meters.

BACKGROUND

There has been a strong interest on the part of utility companies, and similar entities, to take advantage of modern technology to reduce costs and increase efficiency in the meter reading applications. Traditionally, meters, such as electric, water, and gas meters, have been manually read by physically locating a person at each meter. However, recent developments have provided for meters which can be remotely accessed from a central location through wire or wireless communication links. Oftentimes, these remotely accessible meters have battery powered meter interface devices which can access the meter status information, and which can communicate this information to a remotely situated meter reading device. In such cases, issues associated with power consumption management are an important concern in a remote meter reading system.

In a typical environment, a meter reading system includes a large number of meter installations. Low maintenance meters are desirable to facilitate operating efficiency and to reduce maintenance costs. Therefore, it is desirable to have a meter interface device which can operate for an extended period of time without requiring frequent maintenance for battery replacement and the like. Such maintenance requirements may be reduced by increasing battery capacity or by reducing power consumption. The more viable option of reducing power consumption is usually pursued. For example, the meter interface device may be disabled when there is no ongoing communication with a meter reading device. A trade off is usually made between the availability of the device for communications and the amount of power consumption savings which can be achieved. A meter interface device employing the power consumption saving technique described may have a poor response time if communications availability is not adequate. The impact of poor meter response time is magnified when there is a large number meters to be read. Thus, there must be an acceptable procedure for ensuring that the meter interface device is available when needed.

There exists a need to provide for a remote meter reading system in which meters operating under a power saving management system can be read in a time efficient manner. Consequently, the accumulated delay in the response time of remote meters must be reduced where possible.

DETAILED DESCRIPTION OF THE PREFERRED EMBODIMENT

Generally, the present invention provides for a remote meter reading system including a remote meter reading device, or master unit, and a group of remotely located meter interface units, or target units, with communication capability between the meter reading device and the remotely situated meter interface units. In this meter reading system, the remote meter interface units have a power consumption management system which allows each meter interface unit to operate in a reduced power consumption mode. The remote units achieve power consumption savings by alternating between active and inactive states. While in an inactive state there is no communication capability. However, the remote units are periodically activated to enable communications capabilities, and during such period, the remote units are responsive to communication signals initiated by the remote meter reading device. The present invention recognizes that if each remote unit is activated independently, then substantial delay may be incurred in the meter reading process as the meter reading device waits for each remote unit to be activated. Thus, the present invention provides for group activation of the remote units through the use of a group identifier in an activation signal target at the remote units of the group. Moreover, the present invention provides for dynamic allocation of this group identifier.

Figure 1:
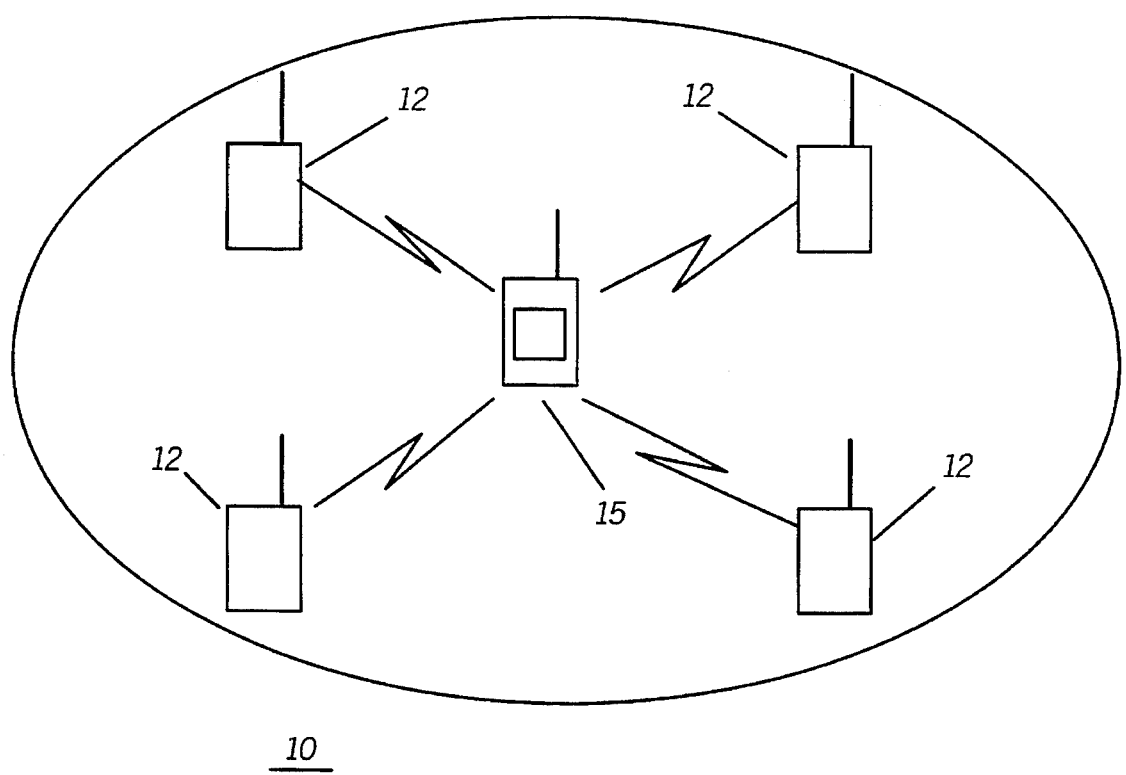
FIG. 1 is a representation of a remote meter reading system, in accordance with the present invention.
Figure 2:
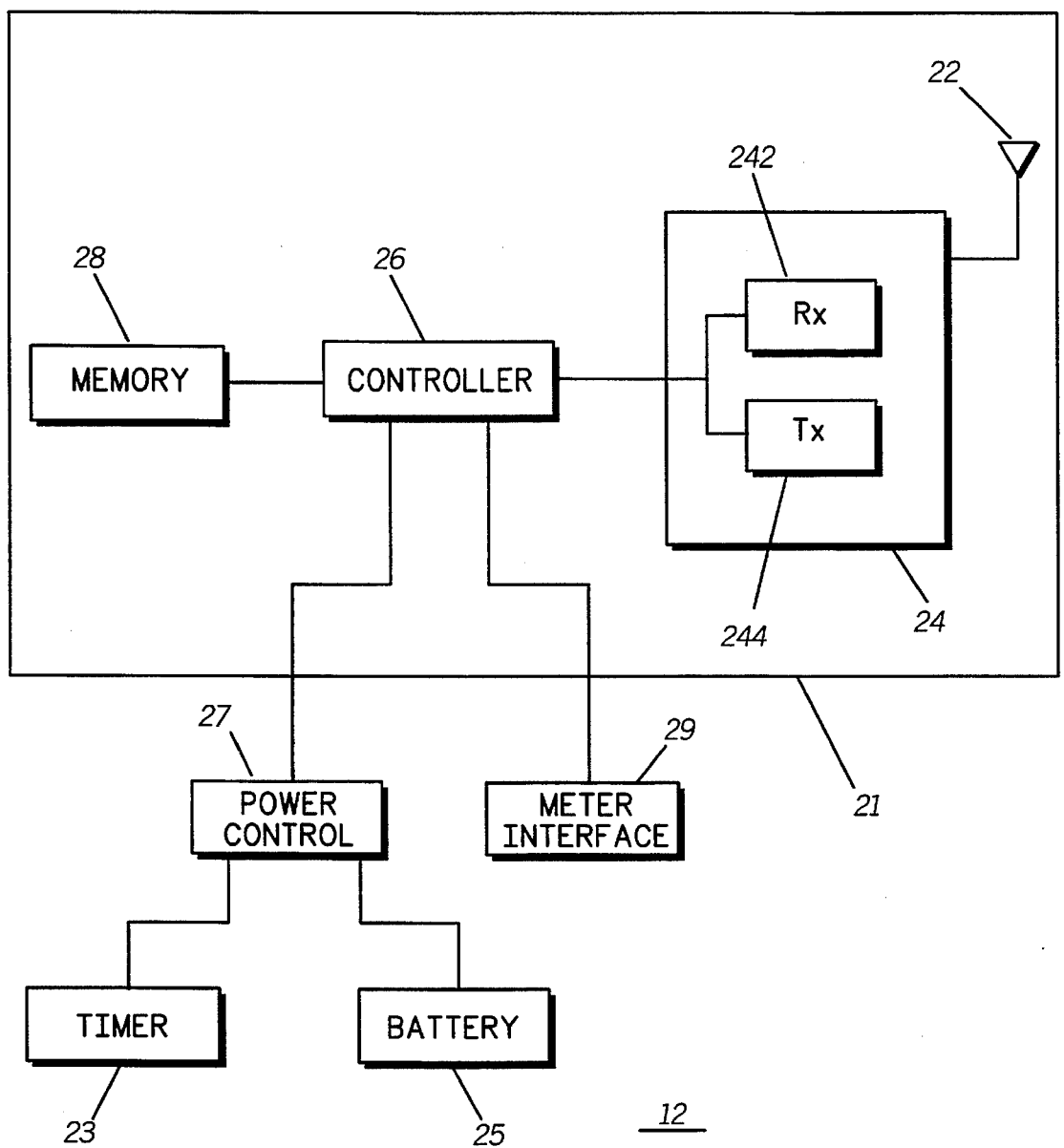
FIG. 2 is a block diagram of a meter interface unit, in accordance with the present invention.

The present invention can be better understood with references to FIGS. 1–4. FIG. 1 is a representation of a remote meter reading system 10 in accordance with the present invention. The system includes at least one meter reading device 15, and a group of remotely located meter interface units 12. The meter reading device 15 is situated such that it is in within communication range of the group of meter interface units 12. Referring to FIG. 2, a block diagram of a meter interface unit 12 is shown in accordance with the present invention. The meter interface unit 12 provides an interface for reading a meter, such as an electricity meter, a water meter, a gas meter, and other similar devices. Additionally, the meter interface unit 12 provides remote access to the functions of each meter. The meter interface unit 12 includes a controller 26, a communication portion 21, a meter interface portion 29, and power control portion 27. The meter interface portion 29 provides access to the functions of an electrically coupled meter. The power control portion 27 controls the power supply to the meter interface unit 12 and facilitates the operation of power consumption management.

The communication portion 21 includes a memory block 28, a radio frequency (RF) signal processing block 24, and an antenna 22. The communication portion 21 is capable of receiving and transmitting communication signals over a communication channel, such as a RF channel, using well-known principles. The controller 26 uses logic and other information from the electrically coupled memory block 28 to control the overall operation of the meter interface unit 12. The controller 26 is electrically coupled to the RF block 24 which includes a receiver 242 and a transmitter 244. The RF block 24 is electrically coupled to the antenna 22. For receive operations, communication signals are received by the antenna 22 and are selectively processed by the receiver 242. Similarly, for transmit operations, communication signals are processed by the transmitter 244 and radiated through the antenna 22. The memory block 28 has storage capabilities and can store information received by the meter interface unit 12.

The meter interface unit 12, including the communication portion 21, is operable in an inactive state to reduce power consumption. The communication portion 21 is periodically operable in an activated state to monitor a communication channel for channel activity. The communication portion 21 is activated by power supplied under the control of the power control portion 27. The power control portion 27 responds to a periodic interrupt signal, or activation signal, supplied by an electrically coupled timer 23. Upon receipt of that activation signal, the power control portion 27 supplies power to the communication unit from an electrically coupled battery 25.

The meter interface unit 12 is responsive to messages received over a monitored communication channel. The message may include specific commands which require a response from the meter interface unit 12. These commands include wake-up requests or activation signals, meter reading requests, and requests for storing and providing a group identifier. The meter interface unit 12 responds to a wake-up request by operating in an activated state for an extended time period. In response to a meter reading request, the meter interface unit 12 communicates with a coupled meter through the meter interface portion 29 to extract status information for the meter. Upon receiving a request for storing a group identifier, the meter interface unit 12 stores the group identifier in the memory block 28. In the preferred embodiment, the meter interface unit 12 responds to meter reading requests with status information for the meter, along with a group identifier representing the group to which the meter interface unit 12 belongs.

Figure 3:
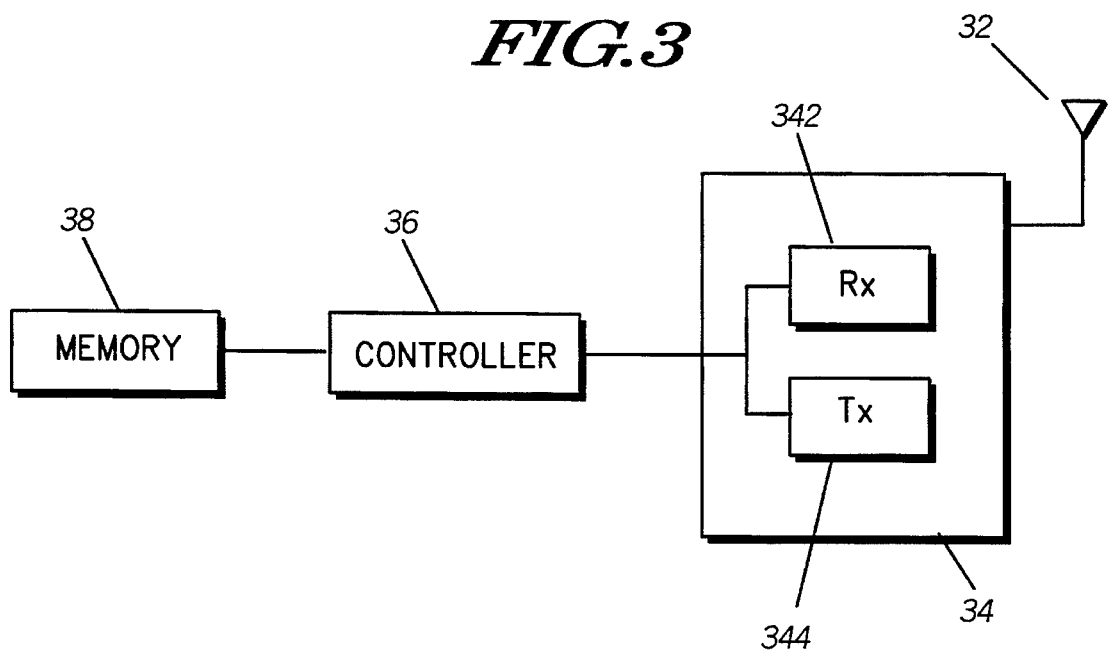
FIG. 3 is a block diagram of a meter reading device, in accordance with the present invention.

Referring to FIG. 3, a block diagram of a meter reading device 15 is shown in accordance with the present invention. The meter reading device 15 has communications capability similar to those described with respect to the meter interface unit 12. Accordingly, the meter reading device 15 has a controller 36, a memory block 38, and a RF portion 34, including a receiver 342 and transmitter 344, for providing two-way communications through an antenna 32. The memory block 38 provides storage capability for the meter reading device 15. Data is stored in the memory block 38 for facilitating the operation of the meter reading device 15. This data may include addresses, or unit identifiers, for the meter interface units 12, group identifiers for the meter interface units 12, and other information needed to facilitate the meter reading system 10. Data may be pre-programmed in the meter reading device 15, or the data may comprise information, such as a group identifier, received via the receiver 342. The meter reading device 15 is capable of initiating communication with the group of remotely situated meter interface units 12 over one or more communication channels or radio frequency channels. The meter reading device 15 initiates communications by transmitting a wake-up request addressed to a specific or target meter interface unit 12. The meter reading device 15 then waits to receive a message from the meter interface units 12 which message contains status information, including the group identifier of the meter interface unit 12. This group identifier is stored in the memory block 38 of the meter reading device 15. The meter reading device 15 is also capable of transmitting over communication channel to the group of meter interface units 12, a message containing a wake-up request, along with the group identifier previously received from one of the meter interface units 12, in order to activate for an extended time the group of meter interface units 12.

Figure 4:
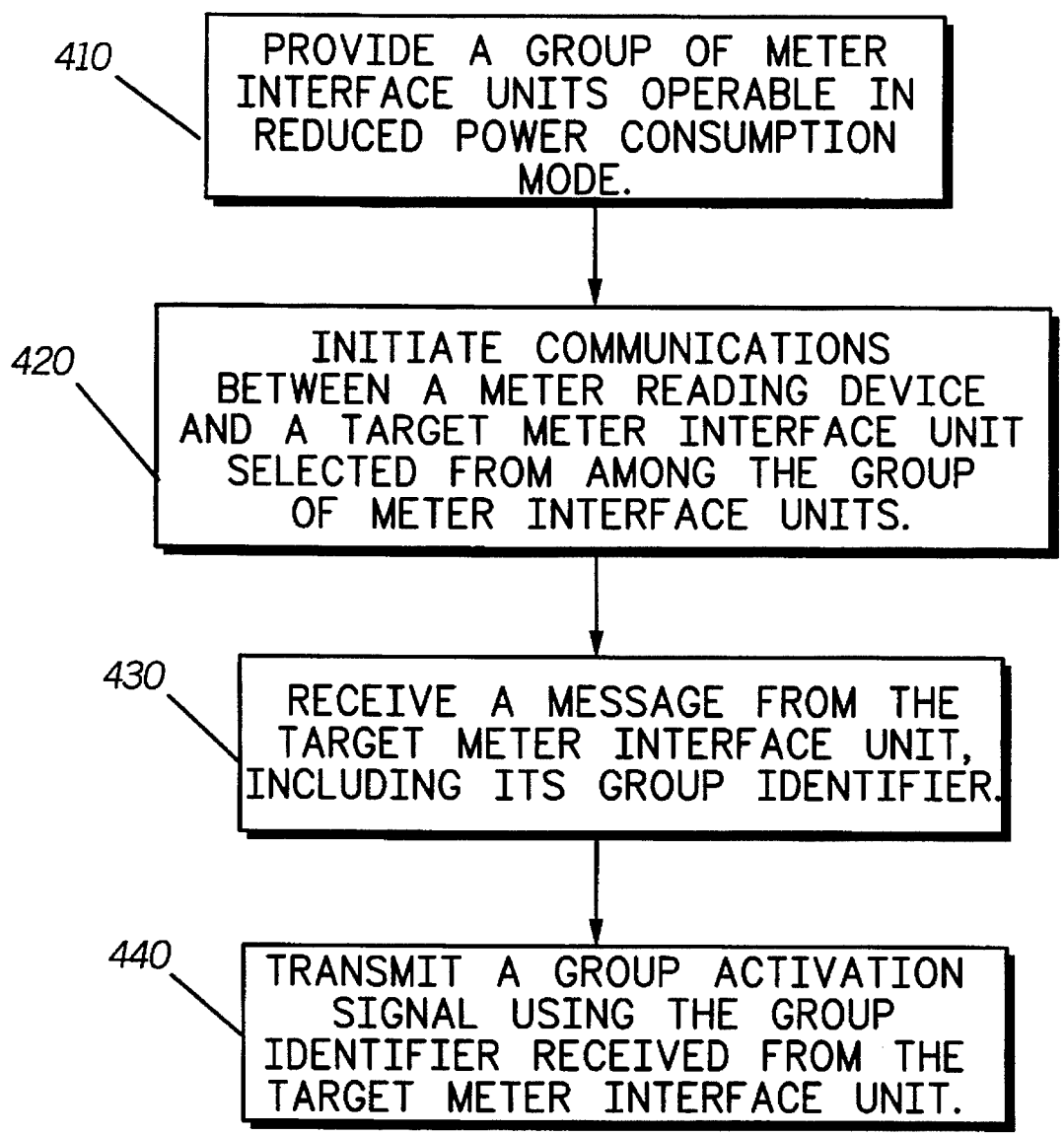
FIG. 4 is a flow chart of a method for remotely accessing a group of meter interface units, in accordance with the present invention.

Referring to FIG. 4, a flow chart of the method of remotely accessing a group of meter interface units is shown in accordance with the present invention. As mentioned earlier, the group of remotely situated meter interface units 12 typically operate in reduced power consumption mode, step 410. A remote meter reading session begins when the meter reading device 15 initiates communications with a target meter interface unit 12 selected from among the group of meter interface units 12, step 420. Preferably, before attempting communication with the group of meter interface units 12, the meter reading device 15 is physically located within communication range of the group of meter interface units 12. Typically, the remote reader has a list of addresses, or unit identifiers, for meter interface units 12 associated with meters to be read. The meter reading device 15 selects a target meter interface unit 12, identified by a unit identifier, from among the list. The meter reading device 15 transmits a message, such as a wake-up request accompanied by the unit identifier, on a communication channel expected to be monitored by the target meter interface unit 12.

Next, the meter reading device 15 monitors the communication channel for a response from the target meter interface unit 12. The target meter interface unit 12 may be in an inactive state, in which case, no response would be immediately forthcoming. Preferably, the meter reading device 15 continues to transmit messages to the target meter interface unit 12 until the target meter interface unit 12 is activated and responds. Once activated, the target meter interface unit 12 transmits a response, or message to the meter reading device 15. This message is received by the meter reading device 15, and includes the group identifier of the meter interface unit 12, step 430. Additional status information, such as unit identifier, may also be transmitted. When the group identifier is received from the target meter interface unit 12, the meter reading device 15 determines whether an assignment of a new group identifier to the target meter interface unit 12 is required.

In one embodiment, the meter reading device 15 determines whether a new group identifier is required by first selecting a primary target meter interface unit 12, which is assumed to have proper configuration. Upon receipt of the group identifier from the primary target meter interface unit 12, this group identifier is stored within the meter reading device 15. When the group identifier of another target meter interface unit 12 is received, both group identifiers are compared. If required, the group identifier of the primary target meter interface unit 12 is transmitted to the target meter interface unit 12. A new group identifier may be needed upon initial activation of a meter interface unit 12, or upon a re-configuration of the meter interface unit 12. When the remote reader determines that a new group identifier is required it transmits a new group identifier to the target meter interface unit 12 for local storage.

Once communication between the meter reading device 15 and the meter interface unit 12 has been established the meter reading device 15 may transmit meter reading requests and other similar commands to the meter interface unit 12. The group identifier received by the meter reading device 15 from the target meter interface unit 12 identifies the group to which that meter interface unit 12 belongs. Using this group identifier, the meter reading device 15 transmits a message on the communication channel monitored by the group of meter interface units 12, which message contains an activation signal or wake-up request directed at the group of meter interface units 12, step 440. The wake-up requests typically include the group identifier previously received from the target meter interface unit 12.

The present invention provides for a remote meter reading system 10 which facilitates power consumption management while improving total response time. Ordinarily, the meter interface units 12 operate in a power saving inactivated mode. According to the present invention, group wake-up requests are employed to reduce the total accumulated delay which would result if each meter interface unit 12 was activated in sequence. Preferably, the group identification information resides in the meter interface unit 12 and can be dynamically changed in response to changing conditions.

What is claimed is:

1. In a remote meter reading system including a group of meter interface units wherein each meter interface unit is operable in an inactive state, wherein each meter interface unit is periodically activated to monitor a communication channel for channel activity, and is responsive to communication signals from a meter reading device, a method of remotely accessing a meter interface unit, comprising the steps of:

initiating, by the meter reading device, communication with a target meter interface unit selected from among the group of meter interface units;

transmitting, by the target meter interface unit, a message containing a group identifier for the target meter interface unit, in response to the communication initiated by the meter reading device, when the target meter interface is activated;

receiving the message by the meter reading device; and transmitting, from the meter reading device, a message on the communication channel, the message including the group identifier received from the target meter interface unit.

2. The method of claim 1, further comprising at the meter reading device after the step of receiving, the steps of:

selecting a primary target meter interface unit from among the group of meter interface units;

storing a group identifier for the primary target meter interface unit;

comparing the group identifier of the target meter interface unit with the group identifier of the primary target meter interface unit; and transmitting the group identifier of the primary target meter interface unit to the target meter interface unit when the comparison of group identifiers indicate that a new group identifier is required by the target meter interface unit.

3. The method of claim 1, further comprising the steps off determining, by the meter reading device, whether an assignment of a new group identifier to the target meter interface unit is required by comparing information received from the target meter interface unit with information stored at the meter reading device; and transmitting a new group identifier from the meter reading device to the target meter interface unit when the meter reading device determines that an assignment of a new group identifier is required.

4. The method of claim 1, wherein the step of initiating, by the meter reading device, communication with a target meter interface unit selected from among the group of meter interface units, comprises the steps of:

selecting a unit identifier from among a plurality of unit identifiers wherein each unit identifier identifies a meter within the group of meter interface units;

transmitting a message, including the unit identifier, on a communication channel monitored by the target meter interface unit.

5. The method of claim 4, wherein the step of transmitting a message, including the unit identifier, on a communication channel monitored by the target meter interface unit, comprises the step of:

situating the meter reading device within communication range of the group of meter interface units.

6. The method of claim 4, wherein the step of transmitting a message, including the unit identifier, on a communication channel monitored by the target meter interface unit, comprises the step of:

transmitting a meter read request as part of the message.

7. The method of claim 1, wherein the step of transmitting, from the meter reading device, a message on the communication channel, the message including the group identifier received from the target meter interface unit, comprises the step of:

transmitting a wake-up request as part of the message.

* * * * *